(12) United States Patent
Chen et al.

(10) Patent No.: US 11,432,245 B2
(45) Date of Patent: *Aug. 30, 2022

(54) SIGNAL TRANSMISSION METHOD, TERMINAL DEVICE, AND NETWORK DEVICE

(71) Applicant: GUANGDONG OPPO MOBILE TELECOMMUNICATIONS CORP., LTD., Guangdong (CN)

(72) Inventors: Wenhong Chen, Guangdong (CN); Zhihua Shi, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/158,544

(22) Filed: Jan. 26, 2021

(65) Prior Publication Data

US 2021/0153135 A1 May 20, 2021

Related U.S. Application Data

(63) Continuation of application No. 16/879,592, filed on May 20, 2020, now Pat. No. 10,945,218, which is a
(Continued)

(51) Int. Cl.
*H04W 52/14* (2009.01)
*H04B 7/06* (2006.01)
*H04W 52/38* (2009.01)

(52) U.S. Cl.
CPC ........ *H04W 52/146* (2013.01); *H04B 7/0626* (2013.01); *H04W 52/386* (2013.01)

(58) Field of Classification Search
CPC ............. H04W 52/146; H04W 52/386; H04W 52/242; H04W 52/08; H04B 7/0695; H04B 7/0626
(Continued)

(56) References Cited

U.S. PATENT DOCUMENTS

| 9,179,419 B2 | 11/2015 | Park et al. |
| 2013/0272158 A1 | 10/2013 | Choi |

(Continued)

FOREIGN PATENT DOCUMENTS

| CN | 106413067 A | 2/2017 |
| EP | 2566079 A1 | 3/2013 |

(Continued)

OTHER PUBLICATIONS

AsusTeK "UL power control in multi-beam based approaches" R1-1711335, 3GPP TSG RAN WG1 NR Ad-Hoc #2; Jun. 2017. 5 pages.

(Continued)

*Primary Examiner* — John J Lee
(74) *Attorney, Agent, or Firm* — Perkins Coie LLP

(57) ABSTRACT

Embodiments of this application disclose a signal transmission method, a terminal device, and a network device. The method includes: determining, by a terminal device, information indicating a channel state information-reference signal (CSI-RS) resource, the information corresponding to a target uplink signal; determining, by the terminal device, a power control parameter of the target uplink signal according to the information indicating the CSI-RS resource; determining, by the terminal device, a transmit power of the target uplink signal according to the power control parameter; and sending, by the terminal device, the target uplink signal to the network device according to the transmit power. The method, the terminal device, and the network device in the embodiments of this application help improve the accuracy of power control, so that system transmission performance can be improved.

17 Claims, 3 Drawing Sheets

Related U.S. Application Data continuation of application No. PCT/CN2017/112718, filed on Nov. 23, 2017.

(58) Field of Classification Search
USPC .................. 455/522, 69, 452.1, 509, 67.11
See application file for complete search history.

(56) References Cited

U.S. PATENT DOCUMENTS

| | | | |
|---|---|---|---|
| 2014/0162717 A1* | 6/2014 | Liu | H04L 5/0051 455/522 |
| 2016/0127999 A1 | 5/2016 | Li | |
| 2017/0086150 A1 | 3/2017 | Wang | |
| 2019/0104477 A1* | 4/2019 | MolavianJazi | H04L 5/0023 |
| 2020/0119799 A1* | 4/2020 | Jung | H04B 7/0695 |

FOREIGN PATENT DOCUMENTS

| | | |
|---|---|---|
| EP | 2747494 A1 | 6/2014 |
| KR | 20160020570 A | 2/2016 |
| KR | 20160021439 A | 2/2016 |
| RU | 2602811 C2 | 11/2016 |
| WO | 2013141505 A1 | 9/2013 |

OTHER PUBLICATIONS

CIPO, Examiner's Report for Canadian Patent Application No. 3083010. dated Jun. 23, 2021. 4 pages.

Ericsson "Remaining issues of PUCCH power control" R1-1721033, 3GPP TSG-RAN WG1 #91, 2017. 5 pages.

IPA, Notice of Acceptance for Australian Patent Application No. 2017440897. dated May 14, 2021. 3 pages.

JPO, Notice of Reasons for Refusal for Japanese Patent Application No. 2020-527875. dated Apr. 16, 2021. 7 pages with English translation.

KIPO, Notification of Reason for Refusal for Korean Patent Application No. 10-2020-7014287. dated Jun. 25, 2021. 4 pages with English translation.

Corrected Notice of Allowability dated Jan. 6, 2021 of U.S. Appl. No. 16/879,592, filed May 20, 2020.

Guangdong OPPO Mobile Telecommunication Corp Ltd., International Search Report and Written Opinion, PCT/CN2017/112718, dated Jan. 4, 2018, 13 pgs.

Guangdong OPPO Mobile Telecommunications Corp. Ltd., Decision to Grant, RU2020119492, dated Nov. 9, 2020, 22 pgs.

Guangdong OPPO Mobile Telecommunications Corp. Ltd., Examination Report No. 1, AU2017440897, dated Nov. 23, 2020, 4 pgs.

Guangdong OPPO Mobile Telecommunications Corp. Ltd., Extended European Search Report, EP17933143.4, dated Sep. 29, 2020, 9 pgs.

Intel Corporation, "Remaining Details on UL Power Control Framework," 3GPP TSG RAN WG1 Meeting 90bis, R1-1717408, Prague, CZ, Oct. 9-13, 2017, 5 pgs.

Intel Corporation, Uplink Power Control Discussion for CoMP Scenario 4, 3GPP TSG-RAN WG1 #65, R1-111598, May 9-13, 2011, 16 pgs.

LG Electronics, "Discussion on UL power control for NR," 3GPP TSG RAN WG1, Meeting NR#3, R1-1715902, Nagoya, Japan, Sep. 18-21, 2017, 8 pgs.

LG Electronics, "Uplink Power Control for CoMP," 3GPP TSG RAN WG1, Meeting #68, R1-120444, Dresden, Germany, Feb. 6-10, 2012, 4 pgs.

Non-Final Office Action dated Jul. 9, 2020 of U.S. Appl. No. 16/879,592, filed May 20, 2020.

Notice of Allowance dated Oct. 30, 2020 of U.S. Appl. No. 16/879,592, filed May 20, 2020.

ZTE, Sanechips, "Summary of remaining issues on UL power control," 3GPP TSG RAN WG.1 Meeting #91, R1-1720839, Reno, USA, Nov. 27-Dec. 1, 2017, 14 pgs.

Examination Report for Indian Application No. 202017024443 dated Sep. 22, 2021. 6 pages with English translation.

Extended European Search Report for European Application No. 21195374.0 dated Feb. 3, 2022. 10 pages.

First Office Action for Chinese Application No. 202010423295.9 dated Jan. 12, 2022. 23 pages with English translation.

Second Examiner's Report for Canadian Application No. 3083010 dated Mar. 29, 2022. 4 pages.

* cited by examiner

SIGNAL TRANSMISSION METHOD, TERMINAL DEVICE, AND NETWORK DEVICE

CROSS-REFERENCE TO RELATED APPLICATION

This application is a continuation application of U.S. application Ser. No. 16/879,592, entitled "SIGNAL TRANSMISSION METHOD, TERMINAL DEVICE, AND NETWORK DEVICE" filed on May 20, 2020, which is a continuation of PCT Application No. PCT/CN2017/112718, filed Nov. 23, 2017, both of which are incorporated by reference in their entirety.

TECHNICAL FIELD

Embodiments of this application relate to the field of communications, and more specifically, to a signal transmission method, a terminal device, and a network device.

RELATED ART

For an uplink signal, power control of a terminal is of great significance for power conservation and suppression of inter-cell interference. Therefore, how to improve the accuracy of uplink power control is an issue that is continuously researched.

SUMMARY

In view of this, embodiments of this application provide a signal transmission method, a terminal device, and a network device, thereby helping improve the accuracy of uplink power control, so that system transmission performance can be improved.

According to a first aspect, a signal transmission method is provided, the method including: determining, by a terminal device, information indicating a channel state information-reference signal (CSI-RS) resource, the information corresponding to a target uplink signal; determining, by the terminal device, a power control parameter of the target uplink signal according to the information indicating the CSI-RS resource; determining, by the terminal device, a transmit power of the target uplink signal according to the power control parameter; and sending, by the terminal device, the target uplink signal to a network device according to the transmit power.

The information indicating the CSI-RS resource may be indication information used to indicate a CSI-RS resource. The network device may preconfigure or specify in a protocol one or more CSI-RS resources. The network device may further preconfigure that different CSI-RS resources or different pieces of information indicating the CSI-RS resource correspond to a group of independent power control parameters. The group of independent power control parameters includes a value of at least one power control parameter. The power control parameter may be any one or any combination of parameters in a calculation formula of the transmit power.

A transmit power of a target uplink signal is determined by referring to a power control parameter corresponding to information indicating the CSI-RS resource sent by a network device, thereby helping improve the accuracy of uplink power control, so that system transmission performance can be improved.

In a possible implementation, the target uplink signal is a physical uplink shared channel (PUSCH), a physical uplink control channel (PUCCH) or a sounding reference signal (SRS).

In a possible implementation, the target uplink signal is a PUSCH precoded based on a non-codebook or is an SRS used to obtain a transmission parameter of a PUSCH precoded based on a non-codebook.

In a possible implementation, a CSI-RS resource indicated by the information indicating the CSI-RS resource is used to obtain a precoding matrix or a beam of transmitting of the target uplink signal or is used to obtain a precoding matrix or a beam of transmitting of a first SRS corresponding to the target uplink signal.

In a possible implementation, the first SRS is an SRS used to obtain a transmission parameter of the target uplink signal, or the first SRS is an SRS transmitted on an SRS resource indicated by SRS resource indication information carried in downlink control information (DCI) used to schedule the target uplink signal.

In a possible implementation, the method further includes: receiving, by the terminal device, first information sent by the network device, where the first information carries the information indicating the CSI-RS resource; and the determining, by a terminal device, information indicating the CSI-RS resource corresponding to a target uplink signal includes: determining, by the terminal device, the information indicating the CSI-RS resource in the first information.

In a possible implementation, if the target uplink signal is a PUSCH, the first information is DCI used to schedule the PUSCH or downlink signaling used to configure, trigger or activate a second SRS corresponding to the PUSCH.

In a possible implementation, the second SRS is an SRS used to obtain a transmission parameter of the PUSCH, or the second SRS is an SRS transmitted on an SRS resource indicated by SRS resource indication information included in DCI used to schedule the PUSCH.

In a possible implementation, the transmission parameter includes at least one of the following information: a used frequency domain resource, layer number, precoding matrix, modulation and coding scheme, and transmitting beam.

In a possible implementation, if the target uplink signal is an SRS, the first information is downlink signaling used to configure, trigger or activate the SRS.

In a possible implementation, the method further includes: receiving, by the terminal device, configuration information sent by the network device, where the configuration information is used to indicate a correspondence between at least one CSI-RS resource and at least one group of power control parameters, the at least one CSI-RS resource includes the CSI-RS resource indicated by the information indicating the CSI-RS resource, and each group of power control parameters of the at least one group of power control parameters includes a value of at least one power control parameter; and the determining, by the terminal device, a power control parameter of the target uplink signal according to the information indicating the CSI-RS resource includes: determining, by the terminal device, the power control parameter according to the information indicating the CSI-RS resource and the configuration information.

In a possible implementation, the method further includes: receiving, by the terminal device, configuration information sent by the network device, where the configuration information is used to indicate a correspondence between at least one piece of information indicating the CSI-RS resource information and at least one group of power control parameters, the at least one piece of information indicating the CSI-RS resource includes the information indicating the CSI-RS resource, and each group of power control parameters of the at least one group of power control parameters includes a value of at least one power control parameter; and the determining, by the terminal device, a power control parameter of the target uplink signal according to the information indicating the CSI-RS resource includes: determining, by the terminal device, the power control parameter according to the information indicating the CSI-RS resource and the configuration information.

In a possible implementation, the power control parameter includes at least one piece of information of the following information: a path loss value used to calculate the transmit power, information about a downlink signal used to measure a path loss value used to calculate the transmit power, an open-loop power control parameter, and a closed-loop power control parameter.

In a possible implementation, the open-loop power control parameter includes a value of a target power Po, a value of a path loss weighting factor a, an index of a target power Po or an index of a path loss weighting factor a.

In a possible implementation, the closed-loop power control parameter includes an index of a closed-loop power control process.

In a possible implementation, before the determining, by a terminal device, CSI-RS resource indication information corresponding to a target uplink signal, the method further includes: determining, by the terminal device, the transmit power of the target uplink signal by using a power control parameter preconfigured by the network device.

According to a second aspect, a signal transmission method is provided, the method including: sending, by a network device, information indicating the CSI-RS resource corresponding to a target uplink signal to a terminal device, where the information indicating the CSI-RS resource is used by the terminal device to determine a power control parameter of the target uplink signal; and receiving, by the network device, the target uplink signal sent by the terminal device based on the power control parameter.

In a possible implementation, the target uplink signal is a PUSCH, a PUCCH or an SRS.

In a possible implementation, the target uplink signal is a PUSCH precoded based on a non-codebook or is an SRS used to obtain a transmission parameter of a PUSCH precoded based on a non-codebook.

In a possible implementation, a CSI-RS resource indicated by the information indicating the CSI-RS resource is used to obtain a precoding matrix or a beam of transmitting of the target uplink signal or is used to obtain a precoding matrix or a beam of transmitting of a first SRS corresponding to the target uplink signal.

In a possible implementation, the first SRS is an SRS used to obtain a transmission parameter of the target uplink signal, or the first SRS is an SRS transmitted on an SRS resource indicated by SRS resource indication information carried in DCI used to schedule the target uplink signal.

In a possible implementation, if the target uplink signal is a PUSCH, the information indicating the CSI-RS resource is carried in DCI used to schedule the PUSCH or downlink signaling used to configure, trigger or activate a second SRS corresponding to the PUSCH.

In a possible implementation, the second SRS is an SRS used to obtain a transmission parameter of the PUSCH, or the second SRS is an SRS transmitted on an SRS resource indicated by SRS resource indication information included in DCI used to schedule the PUSCH.

In a possible implementation, the transmission parameter includes at least one of the following information: a used frequency domain resource, layer number, precoding matrix, modulation and coding scheme, and transmitting beam.

In a possible implementation, if the target uplink signal is an SRS, the information indicating the CSI-RS resource is carried in downlink signaling used to configure, trigger or activate the SRS.

In a possible implementation, the method further includes: sending, by the network device, configuration information to the terminal device, where the configuration information is used to indicate a correspondence between at least one CSI-RS resource and at least one group of power control parameters, the at least one CSI-RS resource includes the CSI-RS resource indicated by the information indicating the CSI-RS resource, and each group of power control parameters of the at least one group of power control parameters includes a value of at least one power control parameter.

In a possible implementation, the method further includes: sending, by the network device, configuration information to the terminal device, where the configuration information is used to indicate a correspondence between at least one piece of information indicating the CSI-RS resource and at least one group of power control parameters, the at least one piece of information indicating the CSI-RS resource includes the information indicating the CSI-RS resource, and each group of power control parameters of the at least one group of power control parameters includes a value of at least one power control parameter.

In a possible implementation, the power control parameter includes at least one piece of information of the following information: a path loss value used to calculate a transmit power, information about a downlink signal used to measure a path loss value used to calculate the transmit power, an open-loop power control parameter, and a closed-loop power control parameter.

In a possible implementation, the open-loop power control parameter includes a value of a target power Po, a value of a path loss weighting factor a, an index of a target power Po or an index of a path loss weighting factor a.

In a possible implementation, the closed-loop power control parameter includes an index of a closed-loop power control process.

According to a third aspect, a terminal device is provided. The terminal device is configured to perform the method according to any one of the first aspect or the possible implementations of the first aspect. Specifically, the terminal device includes units configured to perform the method according to any one of the first aspect or the possible implementations of the first aspect.

According to a fourth aspect, a network device is provided. The network device is configured to perform the method according to any one of the second aspect or the possible implementations of the second aspect. Specifically, the network device includes units configured to perform the method according to any one of the second aspect or the possible implementations of the second aspect.

According to a fifth aspect, a terminal device is provided. The terminal device includes a memory, a processor, an input interface, and an output interface. The memory, the processor, the input interface, and the output interface are connected by using a bus system. The memory is configured to store an instruction, and the processor is configured to execute the instruction stored in the memory, to perform the method according to any one of the first aspect or the possible implementations of the first aspect.

According to a sixth aspect, a network device is provided. The network device includes a memory, a processor, an input interface, and an output interface. The memory, the processor, the input interface, and the output interface are connected by using a bus system. The memory is configured to store an instruction, and the processor is configured to execute the instruction stored in the memory, to perform the method according to any one of the second aspect or the possible implementations of the second aspect.

According to a seventh aspect, a computer storage medium is provided, configured to store a computer software instruction used to perform the method according to any one of the first aspect or the possible implementations of the first aspect or the method according to any one of the second aspect or the possible implementations of the second aspect, and including a designed program used to perform the foregoing aspects.

According to an eighth aspect, a computer program product including an instruction is provided, and when the computer program product is executed on a computer, the computer is enabled to perform the method according to any one of the first aspect or the optional implementations of the first aspect or the method according to any one of the second aspect or the optional implementations of the second aspect.

These aspects or other aspects of this application are simpler and more comprehensible in descriptions of the following embodiments.

DETAILED DESCRIPTION

Figure 1:
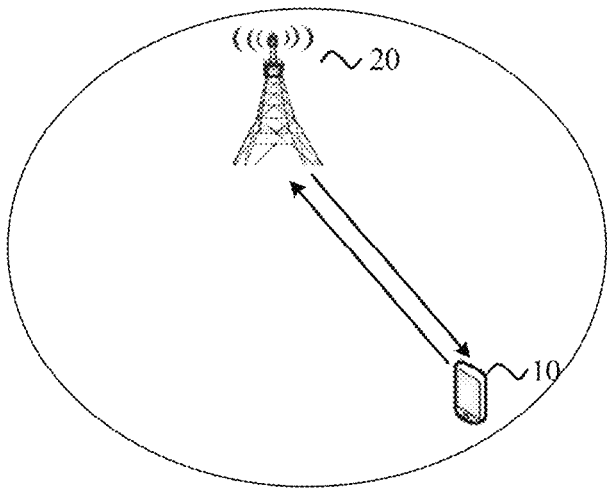
FIG. 1 is a schematic diagram of an application scenario according to an embodiment of this application.

The technical solutions according to embodiments of this application are described below clearly with reference to the accompanying drawings in the embodiments of this application.

It should be understood that, the technical solutions according to the embodiments of this application may be applied to a variety of communications systems, such as a Global System for Mobile communications (GSM) system, a Code Division Multiple Access (CDMA) system, a Wideband Code Division Multiple Access (WCDMA) system, a General Packet Radio Service (GPRS) system, a Long Term Evolution (LTE) system, an LTE Frequency Division Duplex (FDD) system, an LTE Time Division Duplex (TDD) system, a Universal Mobile Telecommunication System (UMTS), a Worldwide Interoperability for Microwave Access (WiMAX) communications system, a new radio (NR) system, a future 5G system or the like.

Particularly, the technical solutions of the embodiments of this application may be applied to various communications systems based on a Non-Orthogonal Multiple Access technology, for example, a Sparse Code Multiple Access (SCMA) system, and a Low Density Signature (LDS) system. Certainly, the SCMA system and the LDS system may also be referred to as other names in the communications field. Further, the technical solutions of the embodiments of this application may be applied to multi-carrier transmission systems in which the Non-Orthogonal Multiple Access technology is used, for example, an Orthogonal Frequency Division Multiplexing (OFDM) system, a Filter Bank Multi-Carrier (FBMC) system, a Generalized Frequency Division Multiplexing (GFDM) system, and a filtered-Orthogonal Frequency Division Multiplexing (F-OFDM) system in which the Non-Orthogonal Multiple Access technology is used.

A terminal device in the embodiments of this application may be user equipment (UE), an access terminal, a subscriber unit, a subscriber station, a mobile station, a mobile console, a remote station, a remote terminal, a mobile device, a user terminal, a terminal, a wireless communications device, a user agent or a user apparatus. The access terminal may be a cellular phone, a cordless phone, a Session Initiation Protocol (SIP) phone, a wireless local loop (WLL) station, a personal digital assistant (PDA), a handheld device having a wireless communication function, a computing device, another processing device connected to a wireless modem, an in-vehicle device, a wearable device, a terminal device in a future 5G network, a terminal device in a future evolved public land mobile network (PLMN) or the like. This is not limited in the embodiments of this application.

A network device in the embodiments of this application may be a device configured to communicate with the terminal device. The network device may be a base transceiver station (BTS) in a GSM or a CDMA system, or may be a NodeB (NB) in a WCDMA system, or may be an evolved NodeB (eNB or eNodeB) in an LTE system, or may be a wireless controller in a cloud radio access network (CRAN) scenario, or the network device may be a relay station, an access point, an in-vehicle device, a wearable device, a network device in a future 5G network, a network device in a future evolved PLMN network or the like. This is not limited in the embodiments of this application.

FIG. 1 is a schematic diagram of an application scenario according to an embodiment of this application. A communications system in FIG. 1 may include a terminal device 10 and a network device 20. The network device 20 is configured to provide a communications service to the terminal device 10 and access a core network, and the terminal device 10 accesses the network by searching for a synchronization signal, a broadcast signal, and the like sent by the network device 20, thereby communicating with the network. An arrow shown in FIG. 1 may indicate uplink/downlink transmission performed over a cellular link between the terminal device 10 and the network device 20.

For an uplink signal, power control of a terminal device is of great significance for power conservation and suppression of inter-cell interference. Therefore, the uplink power control is a focus in LTE. The uplink power control in a cell includes control of powers of a PUSCH, a PUCCH, and an SRS.

Two uplink transmission manners, namely, a codebook-based transmission manner and a non-codebook-based transmission manner, are introduced in NR. For the codebook-based transmission manner, an uplink beam used in transmission is notified to a terminal device by using beam indication information in scheduling information. When using different transmitting beams, the terminal device needs to use different power control parameters. The beam indication information is associated with an uplink power control parameter. The corresponding power control parameter may be determined by using the beam indication information. The association relationship is notified to the terminal device in advance by using radio resource control (RRC) signaling.

For the non-codebook-based uplink transmission, a network side may configure a corresponding CSI-RS resource for an uplink SRS or PUSCH. The terminal device obtains downlink channel information based on the CSI-RS resource, then obtains uplink channel information based on the downlink channel information and channel reciprocity, and calculates a precoding matrix of the uplink SRS or PUSCH according to the uplink channel information. An uplink beam used in transmission may be correspondingly obtained by the terminal device by using uplink and downlink beams. That is, the terminal device may obtain a beam of transmitting of an uplink signal by using a receive beam of a downlink signal, and does not require a beam indication on the network side. In this case, how the terminal device determines corresponding power control parameters for different transmitting beams is an issue.

Figure 2:
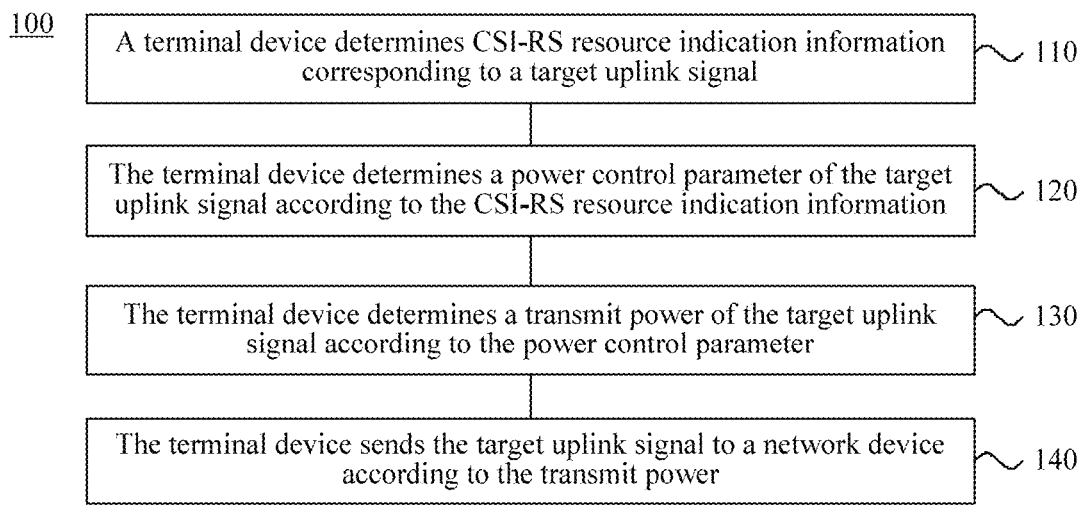
FIG. 2 is a schematic block diagram of a signal transmission method according to an embodiment of this application.

FIG. 2 is a schematic block diagram of a signal transmission method 100 according to an embodiment of this application. As shown in FIG. 2, the method 100 includes some or all of the following content:

S110: A terminal device determines CSI-RS resource indication information corresponding to a target uplink signal.

S120: The terminal device determines a power control parameter of the target uplink signal according to the CSI-RS resource indication information.

S130: The terminal device determines a transmit power of the target uplink signal according to the power control parameter.

S140: The terminal device sends the target uplink signal to a network device according to the transmit power.

Specifically, the network device may preconfigure or specify in a protocol one or more CSI-RS resources. Different beams may be used for CSI-RSs sent on different CSI-RS resources, and the network device may preconfigure or specify in a protocol a correspondence between one or more CSI-RS resources and a power control parameter or a correspondence between one or more pieces of CSI-RS resource indication information and a power control parameter. That is, each CSI-RS resource or each piece of CSI-RS resource indication information may correspond to a group of independent power control parameters. The network device may indicate, to the terminal device, a power control parameter corresponding to a CSI-RS resource or CSI-RS resource indication information to transmit the target uplink signal. The terminal device may make a particular adjustment based on the power control parameter indicated by the network device to determine the power control parameter of the target uplink signal or may directly determine the power control parameter indicated by the network device as the power control parameter of the target uplink signal. The terminal device may further determine the transmit power of the target uplink signal according to the determined power control parameter, to send the target uplink signal to the network device according to the determined transmit power.

Therefore, in the signal transmission method in this embodiment of this application, a transmit power of a target uplink signal is determined by referring to a power control parameter corresponding to CSI-RS resource indication information sent by a network device, thereby helping improve the accuracy of uplink power control, so that system transmission performance can be improved.

The target uplink signal may be a PUSCH, a PUCCH, an SRS or the like. The type of the target uplink signal is not limited in this embodiment of this application. The technical solution in this embodiment of this application may be used to determine a transmit power for any uplink signal.

Further, the target uplink signal is a PUSCH precoded based on a non-codebook or is an SRS used to obtain a transmission parameter of a PUSCH precoded based on a non-codebook. That is, the PUSCH is transmitted in a non-codebook transmission manner. For example, after receiving CSI-RS resource indication information, the terminal device may obtain downlink channel information according to a CSI-RS resource indicated by the CSI-RS resource indication information, then obtain uplink channel information based on the downlink channel information and channel reciprocity, and calculate precoded information of the PUSCH according to the uplink channel information. The terminal device may obtain a beam of transmitting of the PUSCH by using beam correspondence. That is, a receive beam for receiving a CSI-RS by the terminal device may be used to obtain a beam of transmitting for sending a PUSCH. The SRS may be transmitted in a non-codebook-based transmission manner. The target uplink signal may further be an SRS used to obtain a transmission parameter of the PUSCH.

Optionally, in this embodiment of this application, a CSI-RS resource indicated by the CSI-RS resource indication information is used to obtain a precoding matrix or a beam of transmitting of the target uplink signal or is used to obtain a precoding matrix or a beam of transmitting of a first SRS corresponding to the target uplink signal.

How to use a CSI-RS resource indicated by CSI-RS resource indication information to obtain a precoding matrix or a beam of transmitting of a PUSCH has been described above. The method is also applicable to any uplink signal, for example, the PUCCH or SRS.

Further, the first SRS is an SRS used to obtain a transmission parameter of the target uplink signal, or the first SRS is an SRS transmitted on an SRS resource indicated by SRS resource indication information carried in DCI used to schedule the target uplink signal.

Optionally, in this embodiment of this application, transmission parameters of the various uplink signals may all be obtained by using the first SRS. The transmission parameter may include at least one of the following information: a used frequency domain resource, layer number, precoding matrix, modulation and coding scheme, and transmitting beam. That is, after receiving CSI-RS resource indication information, the terminal device may determine a precoding matrix or a beam of transmitting of the first SRS according to a CSI-RS resource indicated by the CSI-RS resource indication information and channel reciprocity. After the terminal device sends the first SRS based on the precoding matrix or beam of transmitting. A network side may determine the transmission parameter of the target uplink signal according to the first SRS, and indicate the determined transmission parameter to the terminal device, or schedule the terminal device according to the determined transmission parameter. The first SRS is used to obtain the transmission parameter of the target uplink signal. This may be implemented by making a quantity of antenna ports of the first SRS equal to a quantity of transmission ports of the target uplink signal.

In addition, the target uplink signal is associated with the SRS, or the DCI used to schedule the target uplink signal may carry the SRS resource indication information for indicating the SRS resource. Generally, the SRS resource indication information carried in the DCI is used to indicate the SRS resource associated with the target uplink signal. The SRS transmitted on the resource is the first SRS.

In this embodiment of this application, the "corresponding" in "the CSI-RS resource indication information corresponding to the target uplink signal" may indicate that the network device and the terminal device specify in advance or the network device configures that an indication manner belongs to a specific uplink signal. For example, it may be specified that a specific field in DCI used to schedule a PUSCH is the CSI-RS resource indication information corresponding to the PUSCH.

In addition, a person skilled in the art understands that the CSI-RS resource indication information may be indication information used to indicate a CSI-RS resource. For example, the network device and the terminal device specify in advance four CSI-RS resources, and specify in advance that two bits are used to indicate the four CSI-RS resources. Specifically, Indication information corresponding to a CSI-RS resource 1 is 00, indication information corresponding to a CSI-RS resource 2 is 01, indication information corresponding to a CSI-RS resource 3 is 10, and indication information corresponding to a CSI-RS resource 4 is 11.

It should be understood that, the power control parameter in this embodiment of this application may be any one or any combination of parameters in a calculation formula of the transmit power. For example, the calculation formula of the transmit power generally includes a maximum allowable transmit power of the terminal device, a power offset, a transmit bandwidth of an uplink signal on a subframe, a target receive power, a path loss compensation factor, a closed-loop power adjustment amount, a path loss, and the like. That is, in this embodiment of this application, a group of power control parameters corresponding to each CSI-RS resource or each piece of CSI-RS resource indication information includes a value of at least one of parameter.

An example in which the target uplink signal is a PUSCH and an example in which the target uplink signal is an SRS are separately used to describe below in detail a manner of carrying a CSI-RS in this embodiment of this application.

Optionally, in this embodiment of this application, the method further includes: receiving, by the terminal device, first information sent by the network device, where the first information carries the CSI-RS resource indication information; and the determining, by a terminal device, CSI-RS resource indication information corresponding to a target uplink signal includes: determining, by the terminal device, the CSI-RS resource indication information in the first information.

It should be understood that, the first information may be, for example, high layer signaling such as RRC signaling and media access control (MAC) signaling, DCI signaling, and system information.

Embodiment 1: If the target uplink signal is a PUSCH, the CSI-RS resource indication information is the CSI-RS resource indication information configured by the network device for the PUSCH, the CSI-RS resource indication information may be carried in DCI for scheduling the PUSCH.

Embodiment 2: If the target uplink signal is a PUSCH and the CSI-RS resource indication information is the CSI-RS resource indication information configured by the network device for the SRS corresponding to the PUSCH, the CSI-RS resource indication information may be carried in downlink signaling used by the network device to configure, trigger or activate transmission of the SRS. Specifically, if the SRS is a periodic SRS, RRC signaling used to configure transmission of the SRS may carry the CSI-RS resource indication information. If the SRS is a non-periodic SRS, DCI used to trigger transmission of the SRS may carry the CSI-RS resource indication information. In this case, the transmission resource of the DCI and the CSI-RS resource indicated by the CSI-RS resource indication information may be included in a same slot. If the SRS is a quasi-continuous SRS, MAC signaling used to activate transmission of the SRS or RRC signaling may carry the CSI-RS resource indication information.

Embodiment 3: If the target uplink signal is an SRS, the CSI-RS resource indication information may be carried in downlink signaling used by the network device to configure, trigger or activate transmission of the SRS. Specifically, if the SRS is a periodic SRS, RRC signaling used to configure transmission of the SRS may carry the CSI-RS resource indication information. If the SRS is a non-periodic SRS, DCI used to trigger transmission of the SRS may carry the CSI-RS resource indication information. In this case, the transmission resource of the DCI and the CSI-RS resource indicated by the CSI-RS resource indication information may be included in a same slot. If the SRS is a quasi-continuous SRS, MAC signaling used to activate transmission of the SRS or RRC signaling may carry the CSI-RS resource indication information.

Optionally, in this embodiment of this application, the method further includes: receiving, by the terminal device, configuration information sent by the network device, where the configuration information is used to indicate a correspondence between at least one CSI-RS resource and at least one group of power control parameters, the at least one CSI-RS resource includes the CSI-RS resource indicated by the CSI-RS resource indication information, and each group of power control parameters of the at least one group of power control parameters includes a value of at least one power control parameter; and the determining, by the terminal device, a power control parameter of the target uplink signal according to the CSI-RS resource indication information includes: determining, by the terminal device, the power control parameter according to the CSI-RS resource indication information and the configuration information.

Optionally, in this embodiment of this application, the method further includes: receiving, by the terminal device, configuration information sent by the network device, where the configuration information is used to indicate a correspondence between at least one piece of CSI-RS resource indication information and at least one group of power control parameters, the at least one piece of CSI-RS resource indication information includes the CSI-RS resource indication information, and each group of power control parameters of the at least one group of power control parameters includes a value of at least one power control parameter; and the determining, by the terminal device, a power control parameter of the target uplink signal according to the CSI-RS resource indication information includes: determining, by the terminal device, the power control parameter according to the CSI-RS resource indication information and the configuration information.

Specifically, the network side preconfigures values of a group of power control parameters corresponding to each of the at least one CSI-RS resource or each piece of the at least one piece of CSI-RS resource indication information, so that the terminal device may determine values of a corresponding group of power control parameters according to the currently indicated CSI-RS resource or the current CSI-RS resource indication information. Herein, one group of power control parameters may include only one power control parameter, for example, an open-loop power control parameter or a path loss value, or may include a plurality of parameters, for example, open-loop power control parameters and path loss values.

For example, the network device and the terminal device specify in advance four CSI-RS resources, and the four CSI-RS resources respectively have independent power control parameters. In this case, the network device and the terminal device may further specify in advance that two bits are used to indicate the four CSI-RS resources. Specifically, indication information corresponding to a CSI-RS resource 1 is 00, indication information corresponding to a CSI-RS resource 2 is 01, indication information corresponding to a CSI-RS resource 3 is 10, and indication information corresponding to a CSI-RS resource 4 is 11. That is, the network device may configure that 00 corresponds to a power control parameter group 1, 01 corresponds to a power control parameter group 2, 10 corresponds to a power control parameter group 3, and 11 corresponds to a power control parameter group 4. The network device may also configure that the CSI-RS resource 1 corresponds to the power control parameter group 1, the CSI-RS resource 2 corresponds to the power control parameter group 2, the CSI-RS resource 3 corresponds to the power control parameter group 3, and the CSI-RS resource 4 corresponds to the power control parameter group 4. The power control parameter groups 1 to 4 correspond to different values of a same group of the power control parameters.

At least one of the CSI-RS resource and the CSI-RS resource indication information has a correspondence with the power control parameter. That is, after receiving the CSI-RS resource indication information, the terminal device determines, according to a value of the indication information, the power control parameter corresponding to the value. Alternatively, after receiving the CSI-RS resource indication information, the terminal device may first determine, according to the indication information, a CSI-RS resource indicated by the indication information, and further determine, according to the CSI-RS resource, the power control parameter corresponding to the CSI-RS resource. This is not limited in this application.

Optionally, in this embodiment of this application, the power control parameter includes at least one piece of information of the following information: a path loss value used to calculate the transmit power, information about a downlink signal used to measure a path loss value used to calculate the transmit power, an open-loop power control parameter, and a closed-loop power control parameter.

The information about a downlink signal used to measure a path loss value used to calculate the transmit power may be considered as path loss reference association information. That is, the downlink signal may be a subset of downlink signals used to estimate a path loss of the target uplink signal. For example, path loss reference association information of a PUSCH may be downlink pilot signals that are in a configuration set of downlink pilot signals and are used to measure a path loss, so as to estimate a path loss of the PUSCH. The downlink signal may be a downlink synchronous signal block (SSB), a CSI-RS, a physical broadcast channel (PBCH) or a demodulation reference signal (DMRS). For example, the terminal device measures a downlink path loss based on the CSI-RS resource indicated by the CSI-RS resource indication information, so as to obtain the path loss value. For another example, the terminal device determines an index k of a corresponding downlink signal according to the CSI-RS resource indication information, and measures a downlink path loss based on a downlink signal indicated by the index k, so as to obtain the path loss value. Herein, a correspondence between CSI-RS resource indication information and an index k of a downlink signal is preconfigured by the network side by using high layer signaling.

Optionally, the open-loop power control parameter includes a value of a target power Po, a value of a path loss weighting factor a, an index j of the target power Po or an index p of the path loss weighting factor a. An index j indicates one target power from values of a plurality of target powers preconfigured by using high layer signaling, and an index p indicates one path loss weighting factor from values of a path plurality of loss weighting factors preconfigured by using high layer signaling. Herein, a correspondence among the value of the target power Po, the value of the path loss weighting factor a, the index j of the target power Po, and the index p of the path loss weighting factor and the CSI-RS resource indication information may be preconfigured by using high layer signaling.

Optionally, the closed-loop power control parameter includes an index l of a closed-loop power control process. The index l indicates one power control process in at least one predefined power control process. A correspondence between an index l and CSI-RS resource indication information may be preconfigured by using high layer signaling.

Optionally, in this embodiment of this application, before the determining, by a terminal device, CSI-RS resource indication information corresponding to a target uplink signal, the method further includes: determining, by the terminal device, the transmit power of the target uplink signal by using a power control parameter preconfigured by the network device.

Specifically, if the terminal device does not receive CSI-RS resource indication information sent by the network side, the power control parameter preconfigured by the network side for the target uplink signal is used until the CSI-RS resource indication information is received. Specifically, after the CSI-RS resource indication information is received, a power control parameter corresponding to the CSI-RS resource indication information is used to replace a value preconfigured by the network side.

Figure 3:
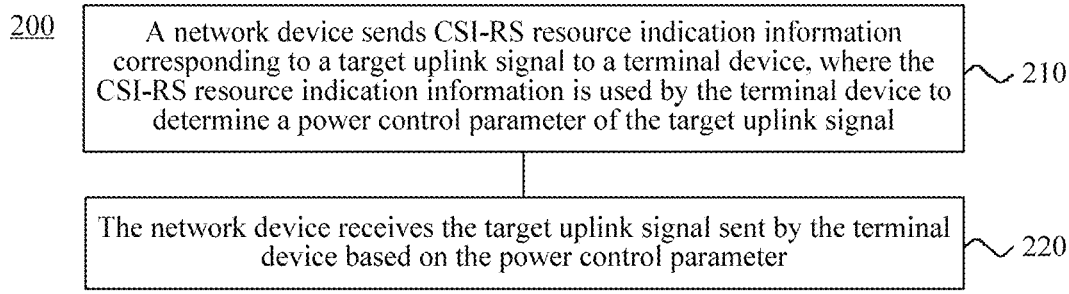
FIG. 3 is another schematic block diagram of a signal transmission method according to an embodiment of this application.

FIG. 3 is a schematic block diagram of a signal transmission method 200 according to an embodiment of this application. As shown in FIG. 3, the method 200 includes some or all of the following content:

S210: A network device sends CSI-RS resource indication information corresponding to a target uplink signal to a terminal device, where the CSI-RS resource indication information is used by the terminal device to determine a power control parameter of the target uplink signal.

S220: The network device receives the target uplink signal sent by the terminal device based on the power control parameter.

Therefore, in the signal transmission method in this embodiment of this application, a transmit power of a target uplink signal is determined by referring to a power control parameter corresponding to CSI-RS resource indication information sent by a network device, thereby helping improve the accuracy of uplink power control, so that system transmission performance can be improved.

Optionally, in this embodiment of this application, the target uplink signal is a PUSCH, a PUCCH or an SRS.

Optionally, in this embodiment of this application, the target uplink signal is a PUSCH precoded based on a non-codebook or is an SRS used to obtain a transmission parameter of a PUSCH precoded based on a non-codebook.

Optionally, in this embodiment of this application, a CSI-RS resource indicated by the CSI-RS resource indication information is used to obtain a precoding matrix or a beam of transmitting of the target uplink signal or is used to obtain a precoding matrix or a beam of transmitting of a first SRS corresponding to the target uplink signal.

Optionally, in this embodiment of this application, the first SRS is an SRS used to obtain a transmission parameter of the target uplink signal, or the first SRS is an SRS transmitted on an SRS resource indicated by SRS resource indication information carried in DCI used to schedule the target uplink signal.

Optionally, in this embodiment of this application, if the target uplink signal is a PUSCH, the CSI-RS resource indication information is carried in DCI used to schedule the PUSCH or downlink signaling used to configure, trigger or activate a second SRS corresponding to the PUSCH.

Optionally, in this embodiment of this application, the second SRS is an SRS used to obtain a transmission parameter of the PUSCH, or the second SRS is an SRS transmitted on an SRS resource indicated by SRS resource indication information included in DCI used to schedule the PUSCH.

Optionally, in this embodiment of this application, the transmission parameter includes at least one of the following information: a used frequency domain resource, layer number, precoding matrix, modulation and coding scheme, and transmitting beam.

Optionally, in this embodiment of this application, if the target uplink signal is an SRS, the CSI-RS resource indication information is carried in downlink signaling used to configure, trigger or activate the SRS.

Optionally, in this embodiment of this application, the method further includes: sending, by the network device, configuration information to the terminal device, where the configuration information is used to indicate a correspondence between at least one CSI-RS resource and at least one group of power control parameters, the at least one CSI-RS resource includes the CSI-RS resource indicated by the CSI-RS resource indication information, and each group of power control parameters of the at least one group of power control parameters includes a value of at least one power control parameter.

Optionally, in this embodiment of this application, the method further includes: sending, by the network device, configuration information to the terminal device, where the configuration information is used to indicate a correspondence between at least one piece of CSI-RS resource indication information and at least one group of power control parameters, the at least one piece of CSI-RS resource indication information includes the CSI-RS resource indication information, and each group of power control parameters of the at least one group of power control parameters includes a value of at least one power control parameter.

Optionally, in this embodiment of this application, the power control parameter includes at least one piece of information of the following information: a path loss value used to calculate the transmit power, information about a downlink signal used to measure a path loss value used to calculate the transmit power, an open-loop power control parameter, and a closed-loop power control parameter.

Optionally, in this embodiment of this application, the open-loop power control parameter includes a value of a target power Po, a value of a path loss weighting factor a, an index of a target power Po or an index of a path loss weighting factor a.

Optionally, in this embodiment of this application, the closed-loop power control parameter includes an index of a closed-loop power control process.

It should be understood that, the terms "system" and "network" in this specification are usually interchangeably used in this specification. The term "and/or" in this specification is only an association relationship for describing the associated objects, and represents that three relationships may exist, for example, A and/or B may represent the following three cases: A exists separately, both A and B exist, and B exists separately. In addition, the character "/" in this specification generally indicates an "or" relationship between the associated objects.

It should be understood that, interaction between the network device and the terminal device and related characteristics, functions, and the like described for the network device correspond to related characteristics and functions of the terminal device. Moreover, related content has been described in detail in the foregoing method 100. For brevity, details are not described herein again.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

The signal transmission method according to the embodiments of this application is described above in detail. The signal transmission apparatuses according to the embodiments of this application are described below with reference to FIG. 4 to FIG. 7. Technical features described in the method embodiments are applicable to the following apparatus embodiments.

Figure 4:
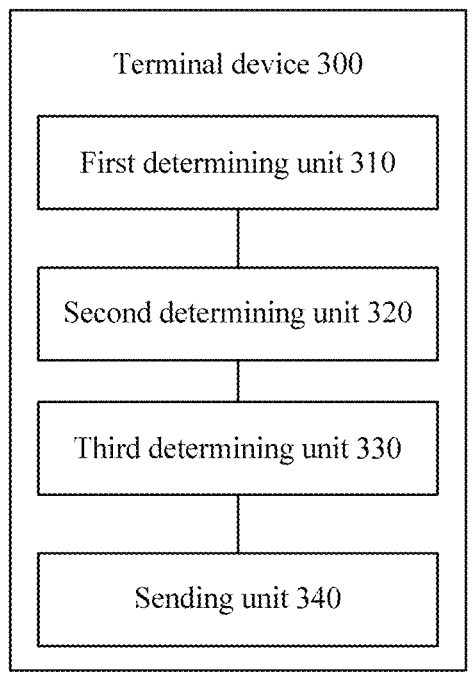
FIG. 4 is a schematic block diagram of a terminal device according to an embodiment of this application.

FIG. 4 is a schematic block diagram of a terminal device 300 according to an embodiment of this application. As shown in FIG. 4, the terminal device 300 includes:

a first determining unit 310, configured to determine CSI-RS resource indication information corresponding to a target uplink signal;

a second determining unit 320, configured to determine a power control parameter of the target uplink signal according to the CSI-RS resource indication information;

a third determining unit 330, configured to determine a transmit power of the target uplink signal according to the power control parameter; and a sending unit 340, configured to send the target uplink signal to a network device according to the transmit power.

Therefore, the terminal device in this embodiment of this application helps improve the accuracy of power control, so that system transmission performance is improved.

Optionally, in this embodiment of this application, the target uplink signal is a PUSCH, a PUCCH or an SRS.

Optionally, in this embodiment of this application, the target uplink signal is a PUSCH precoded based on a non-codebook or is an SRS used to obtain a transmission parameter of a PUSCH precoded based on a non-codebook.

Optionally, in this embodiment of this application, a CSI-RS resource indicated by the CSI-RS resource indication information is used to obtain a precoding matrix or a beam of transmitting of the target uplink signal or is used to obtain a precoding matrix or a beam of transmitting of a first SRS corresponding to the target uplink signal.

Optionally, in this embodiment of this application, the first SRS is an SRS used to obtain a transmission parameter of the target uplink signal, or the first SRS is an SRS transmitted on an SRS resource indicated by SRS resource indication information carried in DCI used to schedule the target uplink signal.

Optionally, in this embodiment of this application, the terminal device further includes: a first receiving unit, configured to receive first information sent by the network device, where the first information carries the CSI-RS resource indication information; and the first determining unit is specifically configured to determine the CSI-RS resource indication information in the first information.

Optionally, in this embodiment of this application, if the target uplink signal is a PUSCH, the first information is DCI used to schedule the PUSCH or downlink signaling used to configure, trigger or activate a second SRS corresponding to the PUSCH.

Optionally, in this embodiment of this application, the second SRS is an SRS used to obtain a transmission parameter of the PUSCH, or the second SRS is an SRS transmitted on an SRS resource indicated by SRS resource indication information included in DCI used to schedule the PUSCH.

Optionally, in this embodiment of this application, the transmission parameter includes at least one of the following information: a used frequency domain resource, layer number, precoding matrix, modulation and coding scheme, and transmitting beam.

Optionally, in this embodiment of this application, if the target uplink signal is an SRS, the first information is downlink signaling used to configure, trigger or activate the SRS.

Optionally, in this embodiment of this application, the terminal device further includes: a second receiving unit, configured to receive configuration information sent by the network device, where the configuration information is used to indicate a correspondence between at least one CSI-RS resource and at least one group of power control parameters, the at least one CSI-RS resource includes the CSI-RS resource indicated by the CSI-RS resource indication information, and each group of power control parameters of the at least one group of power control parameters includes a value of at least one power control parameter; and the second determining unit is specifically configured to determine the power control parameter according to the CSI-RS resource indication information and the configuration information.

Optionally, in this embodiment of this application, the terminal device further includes: a second receiving unit, configured to receive configuration information sent by the network device, where the configuration information is used to indicate a correspondence between at least one piece of CSI-RS resource indication information and at least one group of power control parameters, the at least one piece of CSI-RS resource indication information includes the CSI-RS resource indication information, and each group of power control parameters of the at least one group of power control parameters includes a value of at least one power control parameter; and the second determining unit is specifically configured to determine the power control parameter according to the CSI-RS resource indication information and the configuration information.

Optionally, in this embodiment of this application, the power control parameter includes at least one piece of information of the following information: a path loss value used to calculate the transmit power, information about a downlink signal used to measure a path loss value used to calculate the transmit power, an open-loop power control parameter, and a closed-loop power control parameter.

Optionally, in this embodiment of this application, the open-loop power control parameter includes a value of a target power Po, a value of a path loss weighting factor a, an index of a target power Po or an index of a path loss weighting factor a.

Optionally, in this embodiment of this application, the closed-loop power control parameter includes an index of a closed-loop power control process.

Optionally, in this embodiment of this application, before the determining, by a terminal device, CSI-RS resource indication information corresponding to a target uplink signal, the terminal device further includes: a fourth determining unit, configured to: before the first determining unit determines the CSI-RS resource indication information corresponding to the target uplink signal, determine the transmit power of the target uplink signal by using a power control parameter preconfigured by the network device.

It should be understood that, the terminal device 300 in this embodiment of this application may correspond to the terminal device in the method embodiments of this application, and the foregoing operations and/or functions and other operations and/or functions of the units in the terminal device 300 are respectively for implementing corresponding procedures of the terminal device in the method shown in FIG. 2. For brevity, details are not described herein again.

Figure 5:
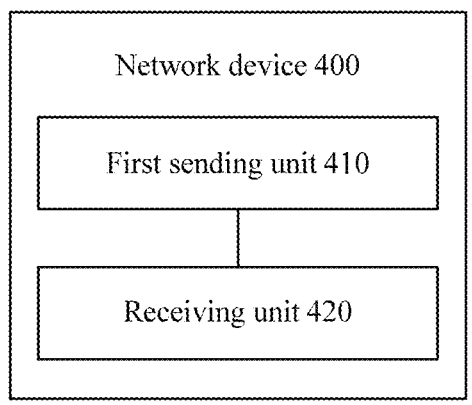
FIG. 5 is a schematic block diagram of a network device according to an embodiment of this application.

FIG. 5 is a schematic block diagram of a network device 400 according to an embodiment of this application. As shown in FIG. 5, the network device 400 includes:

a first sending unit 410, configured to send CSI-RS resource indication information corresponding to a target uplink signal to a terminal device, where the CSI-RS resource indication information is used by the terminal device to determine a power control parameter of the target uplink signal; and a receiving unit 420, configured to receive the target uplink signal sent by the terminal device based on the power control parameter.

Therefore, the network device in this embodiment of this application, thereby helping improve the accuracy of power control, so that system transmission performance is improved.

Optionally, in this embodiment of this application, the target uplink signal is a PUSCH, a PUCCH or an SRS.

Optionally, in this embodiment of this application, the target uplink signal is a PUSCH precoded based on a non-codebook or is an SRS used to obtain a transmission parameter of a PUSCH precoded based on a non-codebook.

Optionally, in this embodiment of this application, a CSI-RS resource indicated by the CSI-RS resource indication information is used to obtain a precoding matrix or a beam of transmitting of the target uplink signal or is used to obtain a precoding matrix or a beam of transmitting of a first SRS corresponding to the target uplink signal.

Optionally, in this embodiment of this application, the first SRS is an SRS used to obtain a transmission parameter of the target uplink signal, or the first SRS is an SRS transmitted on an SRS resource indicated by SRS resource indication information carried in DCI used to schedule the target uplink signal.

Optionally, in this embodiment of this application, if the target uplink signal is a PUSCH, the CSI-RS resource indication information is carried in DCI used to schedule the PUSCH or downlink signaling used to configure, trigger or activate a second SRS corresponding to the PUSCH.

Optionally, in this embodiment of this application, the second SRS is an SRS used to obtain a transmission parameter of the PUSCH, or the second SRS is an SRS transmitted on an SRS resource indicated by SRS resource indication information included in DCI used to schedule the PUSCH.

Optionally, in this embodiment of this application, the transmission parameter includes at least one of the following information: a used frequency domain resource, layer number, precoding matrix, modulation and coding scheme, and transmitting beam.

Optionally, in this embodiment of this application, if the target uplink signal is an SRS, the CSI-RS resource indication information is carried in downlink signaling used to configure, trigger or activate the SRS.

Optionally, in this embodiment of this application, the network device further includes: a second sending unit, configured to send configuration information to the terminal device, where the configuration information is used to indicate a correspondence between at least one CSI-RS resource and at least one group of power control parameters, the at least one CSI-RS resource includes the CSI-RS resource indicated by the CSI-RS resource indication information, and each group of power control parameters of the at least one group of power control parameters includes a value of at least one power control parameter.

Optionally, in this embodiment of this application, the network device further includes: a second sending unit, configured to send configuration information to the terminal device, where the configuration information is used to indicate a correspondence between at least one piece of CSI-RS resource indication information and at least one group of power control parameters, the at least one piece of CSI-RS resource indication information includes the CSI-RS resource indication information, and each group of power control parameters of the at least one group of power control parameters includes a value of at least one power control parameter.

Optionally, in this embodiment of this application, the power control parameter includes at least one piece of information of the following information: a path loss value used to calculate a transmit power, information about a downlink signal used to measure a path loss value used to calculate the transmit power, an open-loop power control parameter, and a closed-loop power control parameter.

Optionally, in this embodiment of this application, the open-loop power control parameter includes a value of a target power Po, a value of a path loss weighting factor a, an index of a target power Po or an index of a path loss weighting factor a.

Optionally, in this embodiment of this application, the closed-loop power control parameter includes an index of a closed-loop power control process.

It should be understood that, the network device 400 in this embodiment of this application may correspond to the network device in the method embodiments of this application, and the foregoing operations and/or functions and other operations and/or functions of the units in the network device 400 are respectively for implementing corresponding procedures of the network device in the method shown in FIG. 3. For brevity, details are not described herein again.

Figure 6:
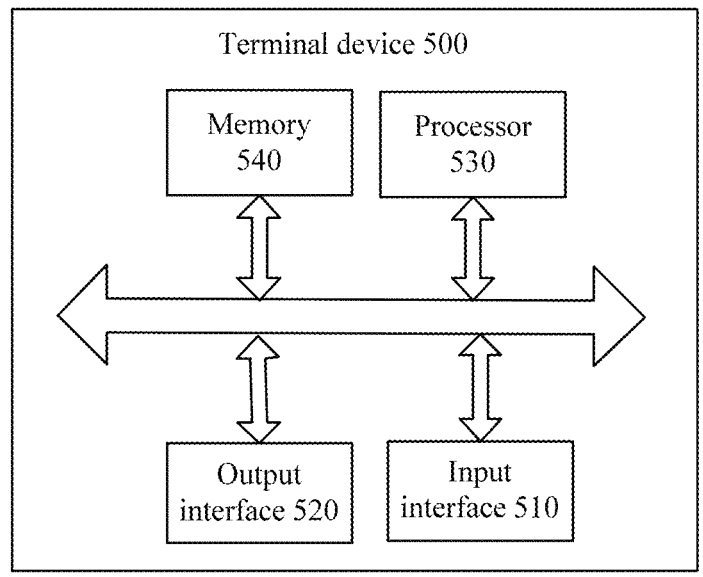
FIG. 6 is another schematic block diagram of a terminal device according to an embodiment of this application.

As shown in FIG. 6, an embodiment of this application further provides a terminal device 500. The terminal device 500 may be the terminal device 300 in FIG. 4, and can be configured to perform the content of the terminal device corresponding to the method 100 in FIG. 2. The terminal device 500 includes an input interface 510, an output interface 520, a processor 530, and a memory 540. The input interface 510, the output interface 520, the processor 530, and the memory 540 may be connected by using a bus system. The memory 540 is configured to store a program, an instruction or code. The processor 530 is configured to execute the program, instruction or code in the memory 540, to control the input interface 510 to receive a signal and control the output interface 520 to send a signal, to complete the operations in the method embodiments.

Therefore, the terminal device in this embodiment of this application, thereby helping improve the accuracy of uplink power control, so that system transmission performance can be improved.

It should be understood that, in this embodiment of this application, the processor 530 may be a central processing unit (CPU). The processor 530 may be another general purpose processor, a digital signal processor (DSP), an application specific integrated circuit (ASIC), a field programmable gate array (FPGA) or another programmable logic device, a discrete gate or a transistor logic device, a discrete hardware component or the like. The general purpose processor may be a microprocessor or the processor may be any conventional processor and the like.

The memory 540 may include a read-only memory (ROM) and a random access memory (RAM), and provide an instruction and data to the processor 530. A part of the memory 540 may further include a non-volatile RAM. For example, the memory 540 may further store device type information.

In an implementation process, each piece of content of the foregoing methods may be implemented by a hardware-integrated logic circuit in the processor 530 or by an instruction in a software form. The content of the method disclosed with reference to the embodiments of this application may be directly performed by a hardware processor, or may be performed by using a combination of hardware in the processor and a software module. The software module may be located in a mature storage medium in the field, such as a RAM, a flash memory, a ROM, a programmable read-only memory (PROM), an electrically-erasable programmable memory or a register. The storage medium is located in the memory 540, and the processor 530 reads information in the memory 540 and completes the content in the foregoing methods in combination with hardware of the processor. To avoid repetition, details are not described herein again.

In a specific implementation, the first determining unit, the second determining unit, the third determining unit, and the fourth determining unit in the terminal device 300 may be implemented by the processor 530 in FIG. 6. The sending unit of the terminal device 300 may be implemented by the output interface 520 in FIG. 6. The first receiving unit and the second receiving unit in the terminal device 300 may be implemented by the input interface 510 in FIG. 6.

Figure 7:
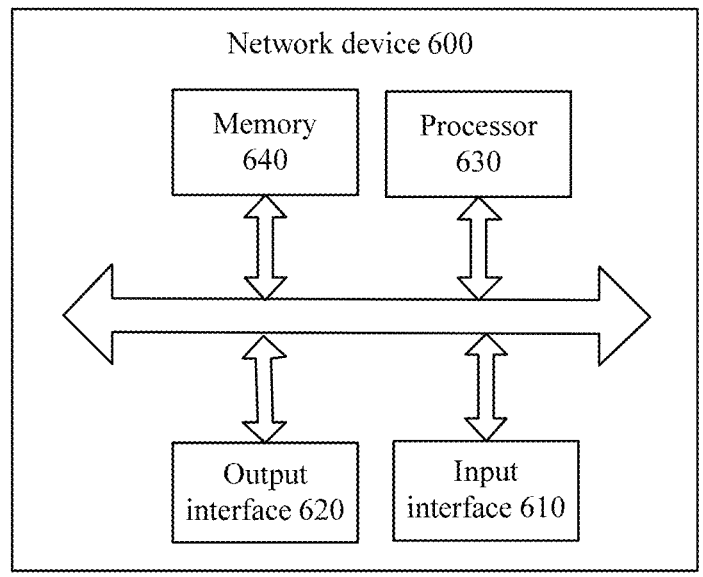
FIG. 7 is another schematic block diagram of a network device according to an embodiment of this application.

As shown in FIG. 7, an embodiment of this application further provides a network device 600. The network device 600 may be the network device 400 in FIG. 5, and can be configured to perform the content of the network device corresponding to the method 200 in FIG. 3. The network device 600 includes an input interface 610, an output interface 620, a processor 630, and a memory 640. The input interface 610, the output interface 620, the processor 630, and the memory 640 may be connected by using a bus system. The memory 640 is configured to store a program, an instruction or code. The processor 630 is configured to execute the program, instruction or code in the memory 640, to control the input interface 610 to receive a signal and control the output interface 620 to send a signal, to complete the operations in the method embodiments.

Therefore, the network device in this embodiment of this application, thereby helping improve the accuracy of power control, so that system transmission performance is improved.

It should be understood that, in this embodiment of this application, the processor 630 may be a CPU. The processor 630 may be another general purpose processor, a DSP, an ASIC, an FPGA or another programmable logic device, a discrete gate or a transistor logic device, or a discrete hardware component or the like. The general purpose processor may be a microprocessor or the processor may be any conventional processor and the like.

The memory 640 may include a ROM and a RAM, and provide an instruction and data to the processor 630. A part of the memory 640 may further include a non-volatile RAM. For example, the memory 640 may further store device type information.

In an implementation process, each piece of content of the foregoing methods may be implemented by a hardware-integrated logic circuit in the processor 630 or by an instruction in a software form. The content of the method disclosed with reference to the embodiments of this application may be directly performed by a hardware processor, or may be performed by using a combination of hardware in the processor and a software module. The software module may be located in a mature storage medium in the field, such as a RAM, a flash memory, a ROM, a PROM, an electrically-erasable programmable memory or a register. The storage medium is located in the memory 640, and the processor 630 reads information in the memory 640 and completes the content in the foregoing methods in combination with hardware of the processor. To avoid repetition, details are not described herein again.

In a specific implementation, the first sending unit and the second sending unit in the network device 400 may be implemented by the output interface 620 in FIG. 7, and the receiving unit in the network device 400 may be implemented by the input interface 610 in FIG. 7.

A person of ordinary skill in the art may be aware that, in combination with the examples described in the embodiments disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the method embodiments, and details are not described herein again.

In the several embodiments provided in this application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional module and sold or used as an independent product, the functions may be stored in a computer-readable storage medium. Based on such an understanding, the technical solutions of this application essentially, or the part contributing to the prior art, or part of the technical solutions may be implemented in the form of a software product. The computer software product is stored in a storage medium, and includes several instructions for instructing a computer device (which may be a personal computer, a server, a network device or the like) to perform all or some of the steps of the embodiments of this application. The foregoing storage medium includes: any medium that can store program codes, such as a USB flash disk, a removable hard disk, a ROM, a RAM, a magnetic disk, or an optical disk.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A signal transmission method, comprising:
    sending, by a network device, configuration information to a terminal device, wherein the configuration information is used to indicate a correspondence between first information and one group of power control parameters, the first information indicating a channel state information-reference signal (CSI-RS) resource and the group of power control parameters comprises a value of at least one power control parameter;
    sending, by the network device, the first and second information to the terminal device, the second information indicating a power control parameter of a target uplink signal, wherein the CSI-RS resource indic.ated by the first information is configured for the terminal device to obtain a beam for transmission of the target unlink signal; and
    receiving, by the network device, the target uplink signal sent by the terminal device based on the power control parameter.

2. The method according to claim 1, wherein the target uplink signal is a physical uplink shared channel (PUSCH), a physical uplink control channel (PUCCH) or a sounding reference signal (SRS).

3. The method according to claim 1, wherein a CSI-RS resource indicated by the information indicating the CSI-RS resource is used to obtain a precoding matrix or a beam of transmitting of the target uplink signal or is used to obtain a precoding matrix or a beam of transmitting of a first SRS corresponding to the target uplink signal.

4. The method according to claim 1, wherein if the target uplink signal is a PUSCH, the first information is DCI used to schedule the PUSCH or downlink signaling used to configure, trigger or activate a second SRS corresponding to the PUSCH.

5. The method according to claim 1, wherein if the target uplink signal is an SRS, the first information is downlink signaling used to configure, trigger or activate the SRS.

6. The method according to claim 1, wherein the power control parameter comprises at least one piece of information of the following information: a path loss value used to calculate the transmit power, information about a downlink signal used to measure a path loss value used to calculate the transmit power, an open-loop power control parameter, and a closed-loop power control parameter.

7. The method according to claim 6, wherein the open-loop power control parameter comprises one of the following parameters including a target power Po, a value of a path loss weighting factor a, an index of a target power Po and an index of a path loss weighting factor a.

8. The method according to claim 6, wherein the closed-loop power control parameter comprises an index of a closed-loop power control process.

9. A network device, comprising:
at least one processor; and
at least one memory including program code;
the at least one memory and the program code configured to, with the at least one processor, cause the network device to perform a plurality of operations including:
sending configuration information to a terminal device, wherein the configuration information is used to indicate a correspondence between first information and one group of power control parameters, the first information indicating a channel state information-reference signal (CSI-RS) resource and the group of power control parameters comprises a value of at least one power control parameter;
sending the first and second information to the terminal device, the second information indicating a power control parameter of a target uplink signal, wherein the CSI-RS resource indicated by the first information is configured for the terminal device to obtain a beam for transmission of the target unlink signal;
receiving the target uplink signal sent by the terminal device based on the power control parameter.

10. The network device according to claim 9, wherein the target uplink signal is a physical uplink shared channel (PUSCH), a physical uplink control channel (PUCCH) or a sounding reference signal (SRS).

11. The network device according to claim 9, wherein a CSI-RS resource indicated by the information indicating the CSI-RS resource is used to obtain a precoding matrix or a beam of transmitting of the target uplink signal or is used to obtain a precoding matrix or a beam of transmitting of a first SRS corresponding to the target uplink signal.

12. The network device according to claim 9, wherein if the target uplink signal is a PUSCH, the first information is DCI used to schedule the PUSCH or downlink signaling used to configure, trigger or activate a second SRS corresponding to the PUSCH.

13. The network device according to claim 9, wherein if the target uplink signal is an SRS, the first information is downlink signaling used to configure, trigger or activate the SRS.

14. The network device according to claim 9, wherein the power control parameter comprises at least one piece of information of the following information: a path loss value used to calculate the transmit power, information about a downlink signal used to measure a path loss value used to calculate the transmit power, an open-loop power control parameter, and a closed-loop power control parameter.

15. The network device according to claim 14, wherein the open-loop power control parameter comprises one of the following parameters including a target power Po, a value of a path loss weighting factor a, an index of a target power Po and an index of a path loss weighting factor a.

16. The network device according to claim 15, wherein the closed-loop power control parameter comprises an index of a closed-loop power control process.

17. A non-transitory computer readable medium comprising program instructions stored thereon that, when executed by a processor of a network device, cause the network device to perform a plurality of operations including:
sending configuration information to a terminal device, wherein the configuration information is used to indicate a correspondence between first information and one group of power control parameters, the first information indicating a channel state information-reference signal (CSI-RS) resource and the group of power control parameters comprises a value of at least one power control parameter;
sending the first and second information to the terminal device, the second information indicating a power control parameter of a target uplink signal, wherein the CSI-RS resource indicated by the first information is configured for the terminal device to obtain a beam for transmission of the target unlink signal; and
receiving the target uplink signal sent by the terminal device based on the power control parameter.

* * * * *